(12) United States Patent
Kuribayashi et al.

(10) Patent No.: US 6,321,865 B1
(45) Date of Patent: Nov. 27, 2001

(54) FRONT-AND-REAR WHEEL DRIVE VEHICLE

(75) Inventors: Takashi Kuribayashi; Hiroyuki Matsuo, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,498

(22) Filed: May 11, 2000

(30) Foreign Application Priority Data

Jun. 22, 1999 (JP) .................................................. 11-176013

(51) Int. Cl.$^7$ .............................. B60K 17/34; F16H 3/72
(52) U.S. Cl. ..................... 180/243; 475/5; 475/2
(58) Field of Search .................. 180/233, 243, 180/244, 65.2; 475/5, 2, 249

(56) References Cited

U.S. PATENT DOCUMENTS

| | | | |
|---|---|---|---|
| 4,635,743 | * | 1/1987 | Riehl ..................................... 180/243 |
| 5,509,491 | * | 4/1996 | Hall, III .................................... 475/2 |
| 6,024,182 | * | 2/2000 | Hamada et al. ..................... 180/243 |
| 6,053,833 | * | 4/2000 | Masaki ..................................... 475/2 |
| 6,105,704 | * | 8/2000 | Hamada et al. ..................... 180/243 |
| 6,125,953 | * | 10/2000 | Arai et al. ............................. 180/243 |

FOREIGN PATENT DOCUMENTS

| | | |
|---|---|---|
| 8-175209 | 7/1996 | (JP) . |
| 9-79348 | 3/1997 | (JP) . |

\* cited by examiner

Primary Examiner—Brian L. Johnson
Assistant Examiner—Matthew Luby
(74) Attorney, Agent, or Firm—Sughrue, Mion, Zinn, Macpeak & Seas, PLLC (57) ABSTRACT

A front-and-rear wheel drive vehicle includes: an engine driving one of pairs of front wheels and rear wheels; a motor driving the other pair of wheels; a wheel speed sensor detecting wheel speeds of the other pair of wheels; a dog clutch provided between the motor and the other pair of wheels; a motor rotation number estimating unit estimating the motor rotation number from the current value and the duty value of the motor; and a control unit controlling the motor rotation number and the engagement of the dog clutch. The control unit engages the dog clutch after the control unit controls the motor rotation number such that the motor rotation number estimated by the motor rotation number estimating unit coincides with motor rotation number corresponding to wheel speeds detected with the wheel speed sensor.

6 Claims, 8 Drawing Sheets

FRONT-AND-REAR WHEEL DRIVE VEHICLE

BACKGROUND OF THE INVENTION

1. Field of the Invention

The present invention relates to a front-and-rear wheel drive vehicle in which one of pairs of front and rear wheels is driven by an engine, while the other pair is driven by start assisting motors.

2. Description of the Related Art

The applicant of this patent application has already proposed a front-and-rear wheel drive vehicle as described above in which when the front wheels slip when they are driven by the engine to start the vehicle, the start assisting motors are driven and the dog clutch provided between the motors and the rear wheels is engaged so as to drive the rear wheels to thereby provide a four-wheel drive condition (refer to Japanese Patent Application No.Hei.9-79348).

When a front-and-rear wheel drive vehicle such as described above starts by driving the front wheels with the engine, since the rear wheels follow by virtue of friction force received from the road surface, the movable dog (a dog connected to the rear wheels and motors) of the dog clutch disposed between the motors and rear wheels rotates and there is generated a relative rotation between the stationary dog (a dog fixed to the casing of the transmission) and the movable dog. Even if the dog clutch is tried to be engaged in this state, since the movable dog is repelled by the stationary dog, it is difficult to have a smooth engagement. Conventionally, to cope with this, the motors are driven idly prior to the engagement of the dog clutch to stop thereby the rotation of the movable dog which is rotated by the rear wheels, and then the two dogs are engaged together in a state in which the relative rotation between the stationary and movable dogs is eliminated or reduced.

However, it was difficult to stop the movable dog by running the motors idly, and it was not possible to avoid an engagement shock that is produced when the dog clutch is engaged.

In general, since there are provided on the vehicle wheel speed sensors for detecting the wheel speeds of the rear wheels, the revolution speed of the movable dog can be computed based on the wheel speeds so detected by the sensors. Therefore, if the motors are driven at a speed corresponding to the detected wheel speed of the rear wheels, it is possible to stop the rotation of the movable dog to have a smooth engagement of the dog clutch. However, in order to perform a feedback control so that the motors run at a predetermined motor rotation number, a motor rotation number sensor is required to detect the speed of the motor, and this leads to an increase in cost. It is, therefore, desirable to prevent the engagement shock of the dog clutch without provision of motor rotation number sensors.

SUMMARY OF THE INVENTION

The present invention was made in view of the aforesaid situation, and an object thereof is to enable a smooth engagement of the dog clutch without provision of any special motor rotation number sensor.

With a view to attaining the aforesaid object, according to a first feature of the invention, there is provided a front-and-rear wheel drive vehicle comprising an engine for driving one of pairs of front wheels and rear wheels, motors for driving the other pair of the pairs of front wheels and rear wheels, a dog clutch (a jaw clutch) disposed between the other pair of the pairs of front wheels and rear wheels and said motors and a control means for controlling the motor rotation numbers and the engagement of the dog clutch wherein when a vehicle starts, the dog clutch is engaged to allow the motor to drive the other pair of wheels to render assistance in starting, and wherein the assistance in starting is stopped when the vehicle speed reaches a predetermined value. Further, there are provided wheel speed sensors for detecting wheel speeds of the other pair of wheels and a motor rotation number estimating means for estimating the motor rotation numbers from the current and duty value (Duty) of the motors, wherein the control means engages the dog clutch after the control means controls the motor rotation numbers such that motor rotation numbers estimated with the motor rotation number estimating means coincide with motor rotation numbers corresponding to wheel speeds detected with the wheel speed sensors.

According to the above construction, when the starting assist by the motors is attempted in starting the vehicle by engaging the dog clutch, since the dog clutch is engaged after the control means controls the motor rotation numbers such that motor rotation numbers estimated with the motor rotation number estimating means coincide with motor rotation numbers corresponding to wheel speeds detected with the wheel speed sensors, it is possible to eliminate a relative rotation between the teeth of the respective dogs which are being brought into mesh engagement with each other to thereby have a smooth engagement of the dogs. Moreover, since the motor rotation numbers needed to control the motors so as to have such a smooth engagement are estimated from the current and duty value of the motors without using any special motor rotation number sensor, it is possible to avoid an increase in the number of components involved and cost. In particular, since the wheel speed sensors generally provided on the vehicle for the anti-lock braking system and the traction control system can be used as the wheel speed sensors for this purpose, there is no risk of increasing the number of components involved and production cost.

DETAILED DESCRIPTION OF THE PREFERRED EMBODIMENTS

A mode for carrying out the invention will be described below based on an embodiment illustrated in the accompanying drawings.

First, referring to FIG. 1, the overall construction of a front-and-rear wheel drive vehicle according to the embodiment of the invention will be described.

A vehicle V is provided with an engine E which is transversely disposed in a front part of a vehicle body thereof. The driving force of this engine is transferred to left and right front wheels $W_{FL}$, $W_{FR}$ via a transmission 1, a differential 2 and left and right drive shafts $3_L$, $3_R$. A generator G adapted to be driven by the engine E is connected to a first battery $B_1$, of 12 volts for feeding electricity to vehicle' headlamps, brake lamps, starter motor, air conditioner and various types of electrical equipment such as audio equipment.

A rear wheel driving device D adapted to be powered by a pair of direct current motors $M_L$, $M_R$ is provided in a rear part of the vehicle body. The driving forces of these motors $M_L$, $M_R$ are transferred, respectively, to left and right rear wheels $W_{RL}$, $W_{RR}$ via the rear wheel driving device D and left and right drive shafts $4_L$, $4_R$. Two second batteries $B_2$, $B_2$ of 12 volts each are connected to each other in series, and the generator G is connected to these second batteries $B_2$, $B_2$ via a DC-DC converter. The operation of the motors $M_L$, $M_R$ is controlled by an electronic control unit U comprising a microcomputer.

Inputted into the electronic control unit U to control the driving of the motors $M_L$, $M_R$ are signals from front wheel speed sensors $S_1$, $S_1$ for detecting the rotating speeds of the left and right front wheels $W_{FL}$, $W_{FR}$, rear wheel rotation number sensors $S_2$, $S_2$ for detecting the rotating speeds of the left and right rear wheels $W_{RL}$, $W_{RR}$, a steering angle sensor $S_3$ for detecting the steering angle of a steering wheel 6, a brake operation sensor $S_4$ for detecting the operation of a brake pedal 7, a shift position sensor $S_5$ for detecting whether a selector lever 8 is in a forward position or in a reverse position, and current sensors $S_6$, $S_6$ for detecting armature current of the motors $M_L$, $M_R$.

Figure 2:
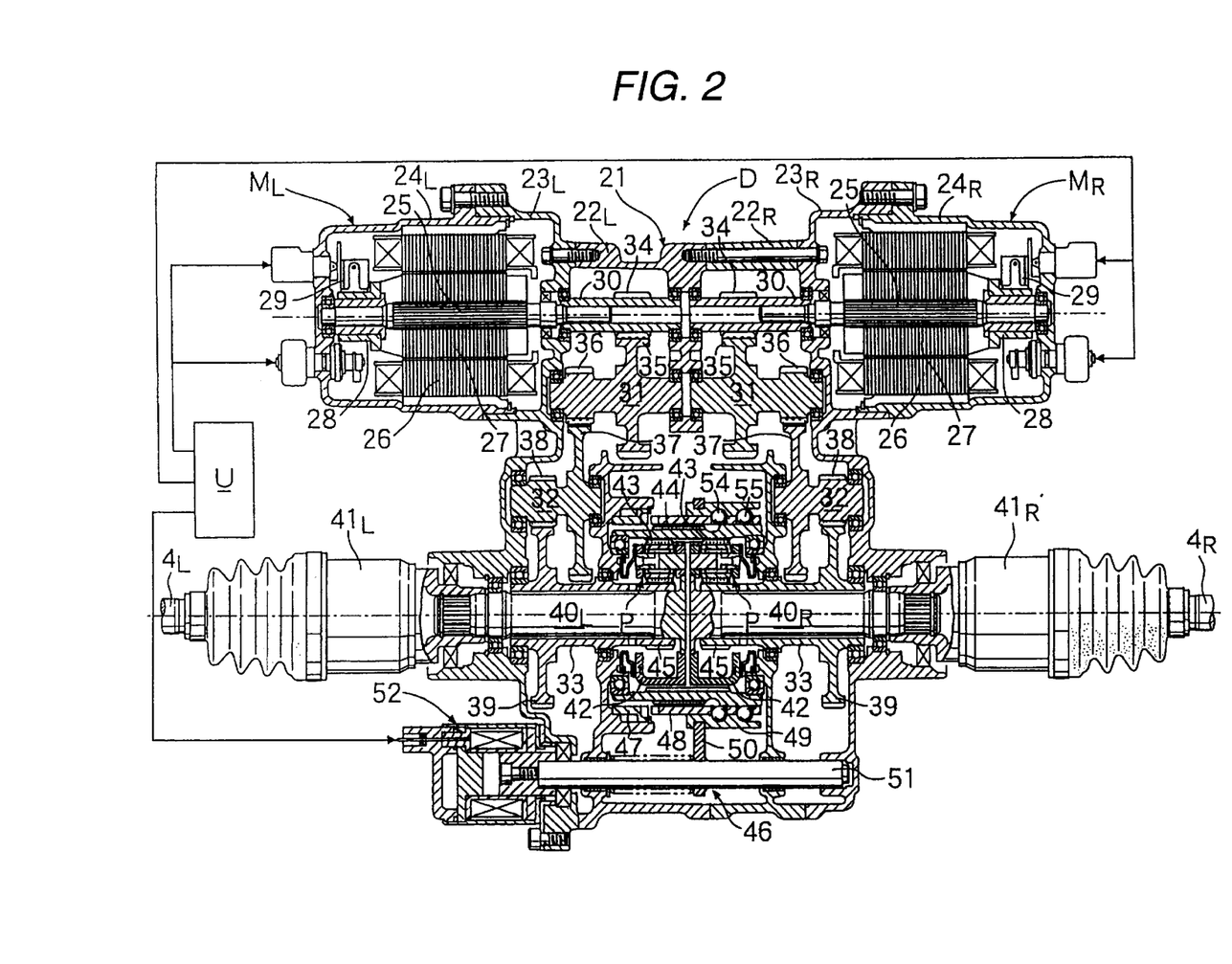
FIG. 2 is an enlarged sectional view of a rear wheel driving device.

Next, referring to FIGS. 2 and 3, the constructions of the rear wheel driving device D and the motors $M_L$, $M_R$ will be described.

A casing 21 for the rear wheel driving device D comprises an left casing main body $22_L$ and a right casing main body $22_R$ which are coupled to each other, an left casing cover $23_L$ coupled to an left side of the left casing main body $22_L$ and a right casing cover $23_R$ coupled to a right side of the right casing main body $22_R$. A motor housing $24_L$ of the left-hand side motor $M_L$ is secured to an left side of the left casing cover $23_L$, and a motor housing $24_R$ of the right-hand side motor $M_R$ is secured to a right side of the right casing cover $23_R$. The respective motors $M_L$, $M_R$ comprise motor shafts 25, 25 rotatably supported on the left and right casing covers $23_L$, $23_R$ and the motor housings $24_L$, $24_R$, stators 26, 26 secured to inner circumferential surfaces of the motor housings $24_L$ $24_R$ rotors 27, 27 secured to the motor shafts 25, 25, commutators 28, 28 secured to the motor shafts 25, 25 and brushes 29, 29 brought into contact with the commutators 28, 28.

Input shafts 30, 30, first speed reducing shafts 31, 31, second speed reducing shafts 32, 32 and third speed reducing shafts 33, 33 are supported in parallel, respectively, between the left casing main body $22_L$ and the left casing cover $23_L$, and between the right casing main body $22_R$ and the right casing cover $23_R$. The motor shafts 25, 25 are splined, respectively, to inner circumferential surfaces of the tubularly formed input shafts 30, 30. First reduction gears 34, 34 provided respectively on the input shafts 30, 30 engage with second reduction gears 35, 35 provided respectively on the first speed reducing shafts 31, 31, third reduction gears 36, 36 provided respectively on the first speed reducing shafts 31, 31 engage with fourth reduction gears 37, 37 provided respectively on the second speed reducing shafts 32, 32, and fifth reduction gears 38, 38 provided respectively on the second speed reducing shafts 32, 32 engage with sixth reduction gears 39, 39 provided respectively on the third speed reducing shafts 33, 33. Therefore, the rotations of the motor shafts 25, 25 are transferred to the third speed reducing shafts 33, 33 via the first to sixth reduction gears 34 to 39, 34 to 39.

Left and right output shafts $40_L$, $40_R$ fit in the interiors of the left and right tubularly formed third speed reducing shafts 33, 33 so as to rotate relative to each other, and the output shafts $40_L$, $40_R$ protrude outwardly of the third speed reducing shafts 33, 33 to thereby be supported on the left and right casing covers $23_L$, $23_R$, respectively. Then, outer ends of the left and right output shafts $40_L$, $40_R$ are connected to the left and right rear wheels $W_{RL}$, $W_{RR}$, respectively, via constant velocity joints $41_L$, $41_R$ and the drive shafts $4_L$, $4_R$.

The left and right third speed reducing shafts 33, 33 and the left and right output shafts $40_L$, $40_R$ are connected, respectively, to planetary gear mechanisms P, P. The left and right planetary gear mechanisms P, P are substantially identical to each other in construction.

The planetary gear mechanisms P, P comprise planetary carriers 42, 42 integrally provided on inner ends of the output shafts $40_L$, $40_R$, a plurality of planetary gears 43,... rotatably supported on the planetary carries 42, 42, a ring gear 44 rotatably supported on the left and right casing main body $22_L$, $22_R$ so as to be in mesh engagement with the planetary gears 43, . . . and sun gears 45, 45 provided respectively on the third speed reducing shafts 33, 33 for mesh engagement with the planetary gears 43, . . . The ring gear 44 is integrally formed so as to be shared between the left and right planetary gear mechanisms P, P.

Figure 4:
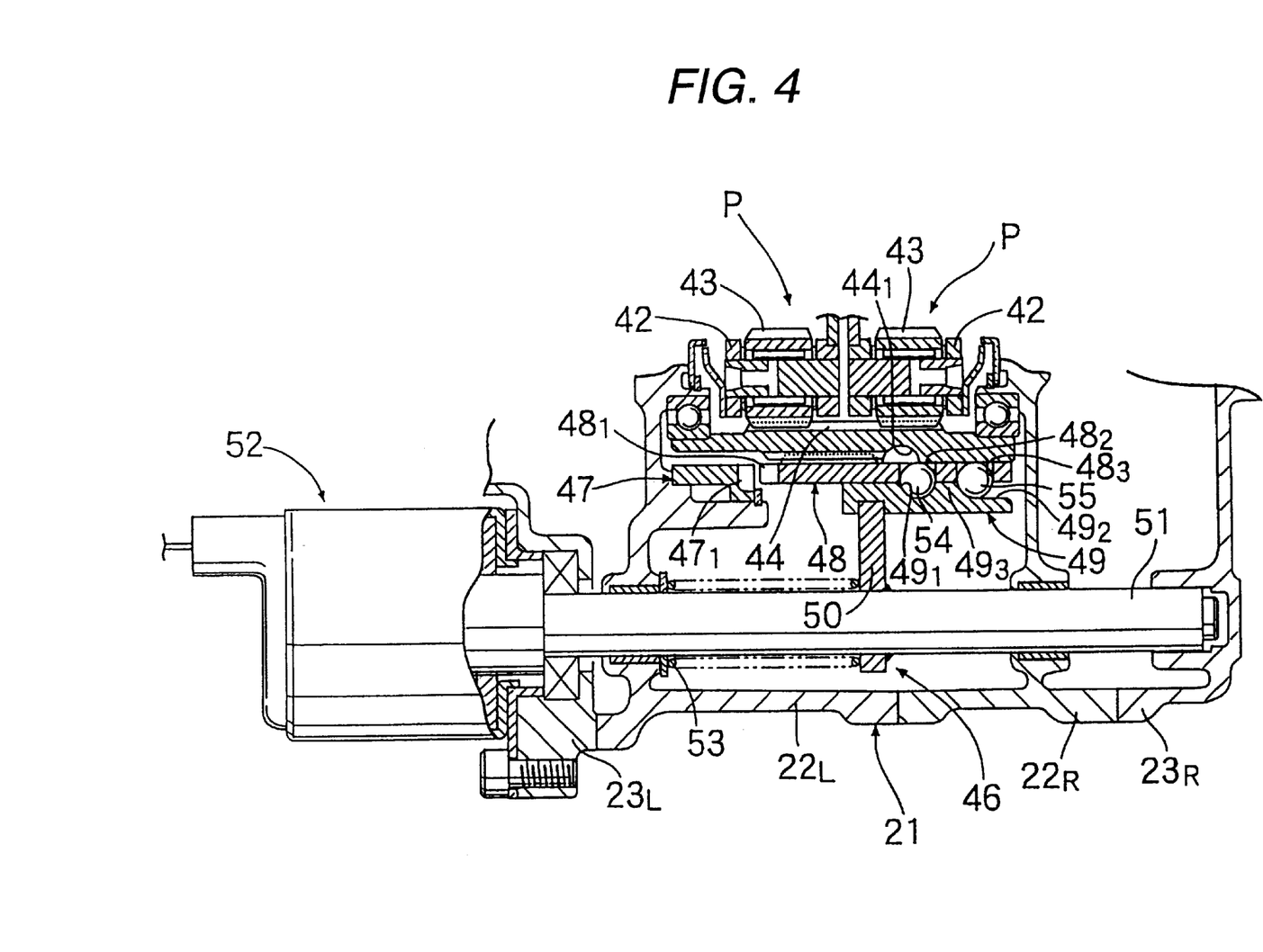
FIG. 4 is an enlarged view of a main part in FIG. 2 showing the construction of a dog clutch.

As shown in FIG. 4, the ring gear 44 adapted to be shared by the left and right planetary gear mechanisms P, P can be coupled to the casing 21 by means of a dog clutch 46. The dog clutch 46 comprises a stationary dog 47 secured to the left casing main body $22_L$, a movable dog 48 splined to the outer circumference of the ring gear 44 in such a manner as to slide in axial directions and provided with dog teeth $48_1$ adapted to engage with dog teeth $47_1$ of the stationary dog 47, a shift sleeve 49 adapted to fit on the outer circumference of the movable dog 48 in such a manner as to slide in the axial directions, a shift fork 50 adapted to engage with the shift sleeve 49, a shift rod 51 supported slidably on the casing 21 so as to support the shift fork 50 thereon, a shift solenoid 52 for driving the shift rod 51 in an leftward direction as viewed in the figure when excited and a return spring 53 for driving back the shift rod 51 in a rightward direction as viewed in the figure when the shift solenoid 52 is not excited.

Two through holes $48_2$, $48_3$ are formed in the movable dog 48 for accommodating two lock balls 54, 55, a depressed portion $44_1$ is formed in the outer circumferential surface of the ring gear 44 confronting the movable dog 48, and two depressed portions $49_1$, $49_2$ are formed in an inner circumferential surface of the shift sleeve 49 confronting the movable dog 48.

Thus, as shown in FIG. 4, when the shift solenoid 52 is in the non-excitation state and the shift rod 51 is moved in the rightward direction as viewed in the figure, the two through holes $48_2$, $48_3$ of the movable dog 48 and the two depressed portions $49_1$, $49_2$ of the shift sleeve 49 align with each other, and the two lock balls 54, 55 fit in there which are biassed radially outwardly by virtue of the centrifugal force. In this state, there is no chance for the lock balls 54, 55 to be brought into engagement with the depressed portion $44_1$ of the ring gear 44, and therefore the ring gear 44 can freely rotate.

Figure 5:
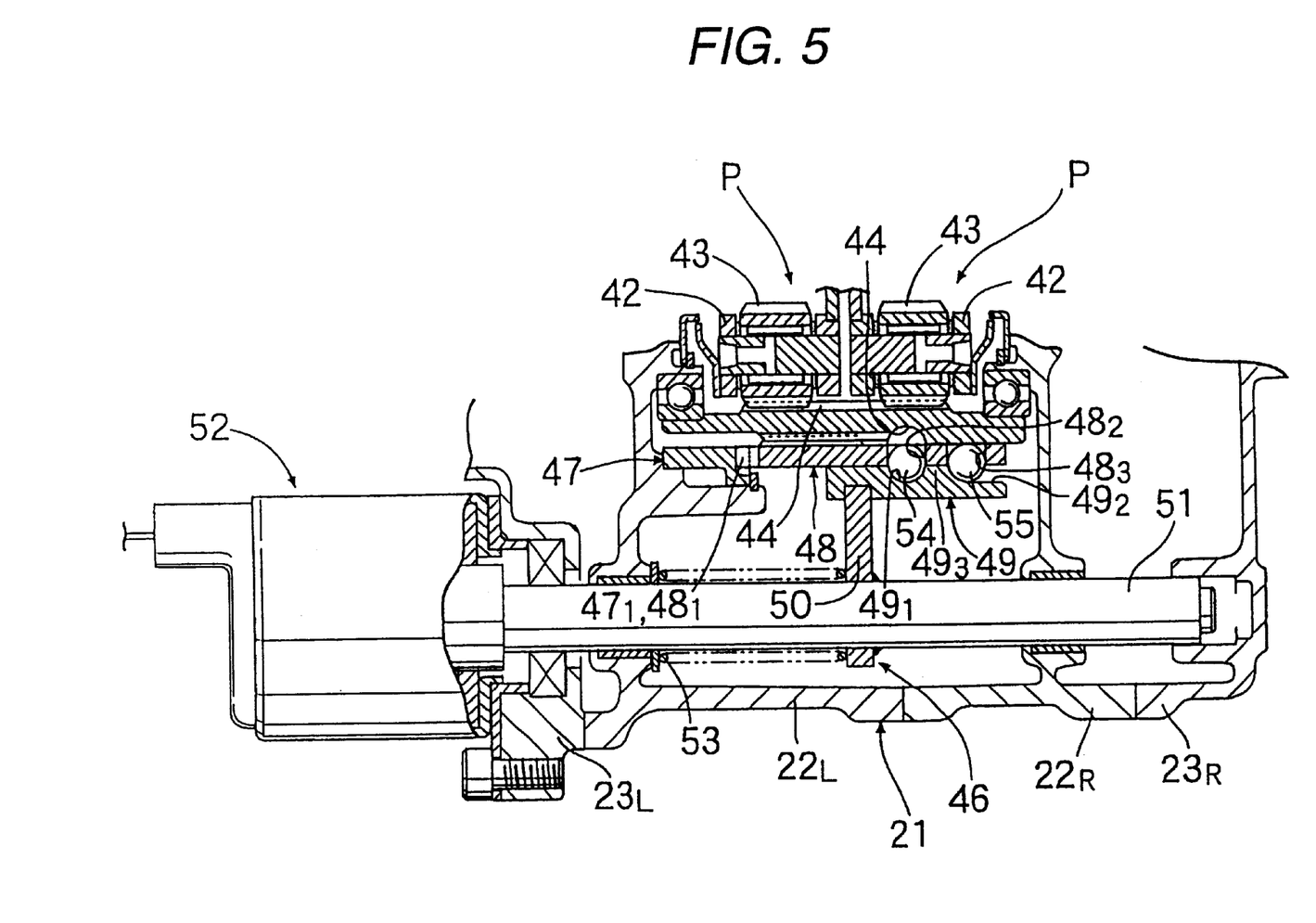
FIG. 5 is an explanatory diagram corresponding to FIG. 4.
Figure 6:
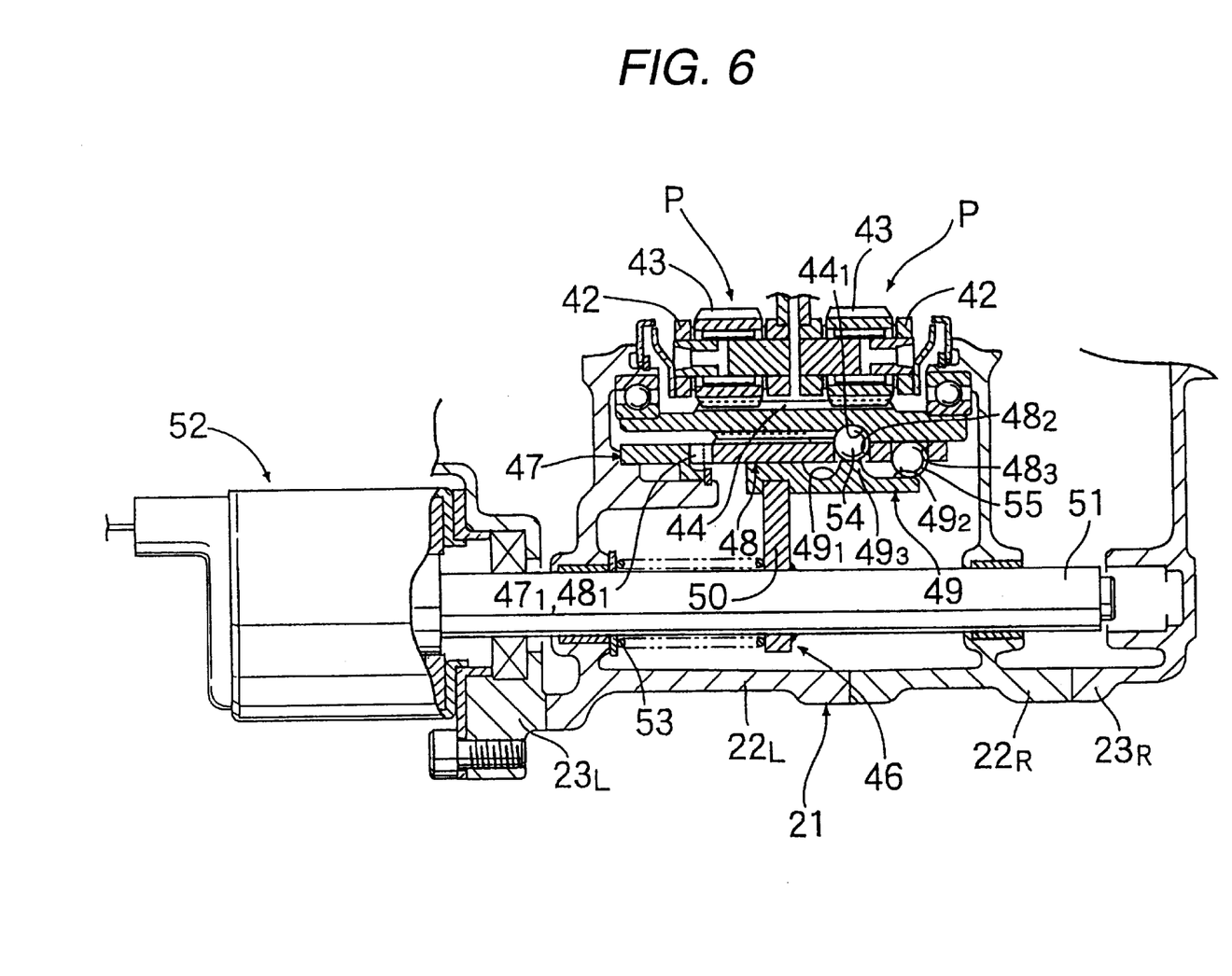
FIG. 6 is an explanatory diagram corresponding to FIG. 4.

As shown in FIG. 5, when the shift solenoid 52 is excited and the shift rod 51 is moved to the leftward direction as viewed in the figure, the shift rod 51 moves the movable dog 48 leftward via the shift fork 50, the shift sleeve 49 and the lock balls 54, 55, and the dog teeth $48_1$ of the movable dog 48 engages with the dog teeth $47_1$ of the stationary dog 47. As shown in FIG. 6, when the shift rod 51 is moved further leftward by the shift solenoid 52, the lock ball 54, which is one of the lock balls 54, 55, rides on a raised portion $49_3$ formed between the two depressed portions $49_1$, $49_2$ of the shift sleeve 49, and part of the lock ball 54 pushed out of the through hole $48_2$ of the movable dog 48 engages with the depressed portion $44_1$ of the ring gear 44. As a result of this, the ring gear 44 is coupled to the left casing main body $22_L$ via the lock ball 54, the movable dog 48 and the stationary dog 47 in such a manner as to prohibit the rotation thereof.

When the vehicle V starts, the start assisting control is performed by the rear wheel driving device D constructed as described above, and after the vehicle has started, turn control and differential restriction control are performed.

(1) Start Assisting Control

When the vehicle V starts forward in a state in which the brake operation sensor $S_4$ detects that the brake pedal 7 is not operated, the shift position detected by the shift position sensor $S_5$ is at a forward running position, and the rear wheel speeds Vr (i.e., the vehicle speed) detected by the rear wheel rotation number sensors $S_2$, $S_2$ are less than 15 km/h, the front wheel speeds Vf detected by the front wheel speed sensors $S_1$, $S_1$ are compared with the rear wheel speeds Vr detected by the rear wheel rotation number sensors $S_2$, $S_2$. When a deviation ΔV (=Vf−Vr) becomes equal to or larger than a threshold value ΔV, in other words, when the slip amount of the front wheels $W_{FL}$, $W_{FR}$ driven by the engine E becomes equal to or larger than a predetermined value, as shown in FIG. 6, the shift solenoid 52 is excited for engagement of the dog clutch, whereby the left and right motors $M_L$, $M_R$ are driven to rotate forward at the same speed in a state in which the ring gear 44 of the planetary gear mechanisms P, P is secured to the casing 21.

Then, the rotations of the left and right motors $M_L$, $M_R$ are transmitted to the sun gears 45, 45 of the planetary gear mechanisms P, P, but since the ring gear 44 is secured to the casing 21 by means of the dog clutch 46, the planetary gears 43, ... which are in mesh with the sun gears 45, 45 and the ring gear 44 rotate around the sun gears 45, 45 while rotating on their own axes, and the planetary carriers 42, 42 supporting the planetary gears 43, ... also rotate. As a result of this, the left and right rear wheels $W_{RL}$, $W_{RR}$ connected to the planetary carries 42, 42 via the output shafts $40_L$, $40_R$ the constant velocity joints $41_L$, $41_R$ and the drive shafts $4_L$, $4_R$ rotate forward at the same speed, whereby the forward start of the vehicle V is assisted.

When the shift position sensor $S_5$ detects that the shift position is at the reverse running position and the vehicle V starts in a reverse direction, with the dog clutch 46 left staying in the engaged state, if the left and right motors $M_L$, $M_R$ are driven to rotate in the reverse direction at the same speed, whereby the left and right rear wheels $W_{RL}$, $W_{RR}$ rotate in the reverse direction at the same speed, the reverse start of the vehicle V being thus assisted.

(2) Turn Control

When the vehicle V has started and the vehicle speed reaches 15 km/h, as shown in FIG. 4, the dog clutch 46 is held in the disengaged state, and the ring gear 44 of the planetary gear mechanisms P, P is allowed to freely rotate. In this state, for example, when the vehicle V turns rightward, the left-hand side motor $M_L$ is driven to rotate forward, while the right-hand side motor $M_R$ is driven to rotate in the reverse direction. Then, the left-hand side sun gear 45 rotates forward and the left-hand side planetary carrier 42 rotates forward relative to the ring gear 44, and at the same time the right-hand side sun gear 45 is driven to rotate in the reverse direction and the right-hand side planetary carrier 42 rotates in the reverse direction relative to the ring gear 44. When this happens, since torques applied to the common ring gear 44 from the left and right planetary carriers 42, 42 are offset by each other, the speed of the left rear wheel $W_{RL}$ is increased, while that of the right rear wheel $W_{RR}$ is decreased. As a result of this, a driving force and a braking force are applied to the left rear wheel $W_{RL}$ and right rear wheel $W_{RR}$, respectively, and this generates a rightward yaw moment, the right turn of the vehicle being thereby assisted.

On the other hand, when the vehicle turns leftward, the driving force and the braking force are applied to the right rear wheel $W_{RR}$ and the left rear wheel $W_{RL}$, respectively, by rotating forward the right-hand side motor $M_R$ and rotating the left-hand side motor $M_L$ in the reverse direction, and an leftward yaw moment is generated, whereby the vehicle V is assisted in turning leftward. In addition, the driving amount of the left and right motors $M_L$, $M_R$ can be determined in response to a turning radius of the vehicle V estimated based on a steering angle detected by the steering angle sensor $S_3$ and a vehicle speed detected by the rear wheel rotation number sensors $S_2$, $S_2$.

(3) Differential Restriction Control

When running straight or tuning at high speed, a differential restriction function is provided in the rear wheel driving device D by producing a regenerative braking force by allowing the left and right motors $M_L$, $M_R$ to function as generators In other words, the rotation of the left rear wheel $W_{RL}$ is braked through transmission thereof to the left-hand side motor $M_L$ via the planetary carrier 42, the planetary gears 43, ... and the sun gear 45, and the rotation of the right rear wheel $W_{RR}$ is braked through transmission thereof to the right-hand side motor $M_R$ via the planetary carrier 42, the planetary gears 43, ... and the sun gear 45. Then, since the left and right planetary gears 43, ... are in mesh with the ring gear 44 disengaged from the casing 21, the difference rotation between the left and right rear wheels $W_{RL}$, $W_{RR}$ is restricted by the braking forces on the left and right motors $M_L$, $M_R$, whereby the differential restriction function is obtained. If a yaw moment is applied to the vehicle V due to disturbance, a yaw moment which opposes this yaw moment is generated, stability in straight running or high-speed turning being thereby improved.

Next, the engagement control of the dog clutch 46 in the above start assist control will be described below.

Figure 3:
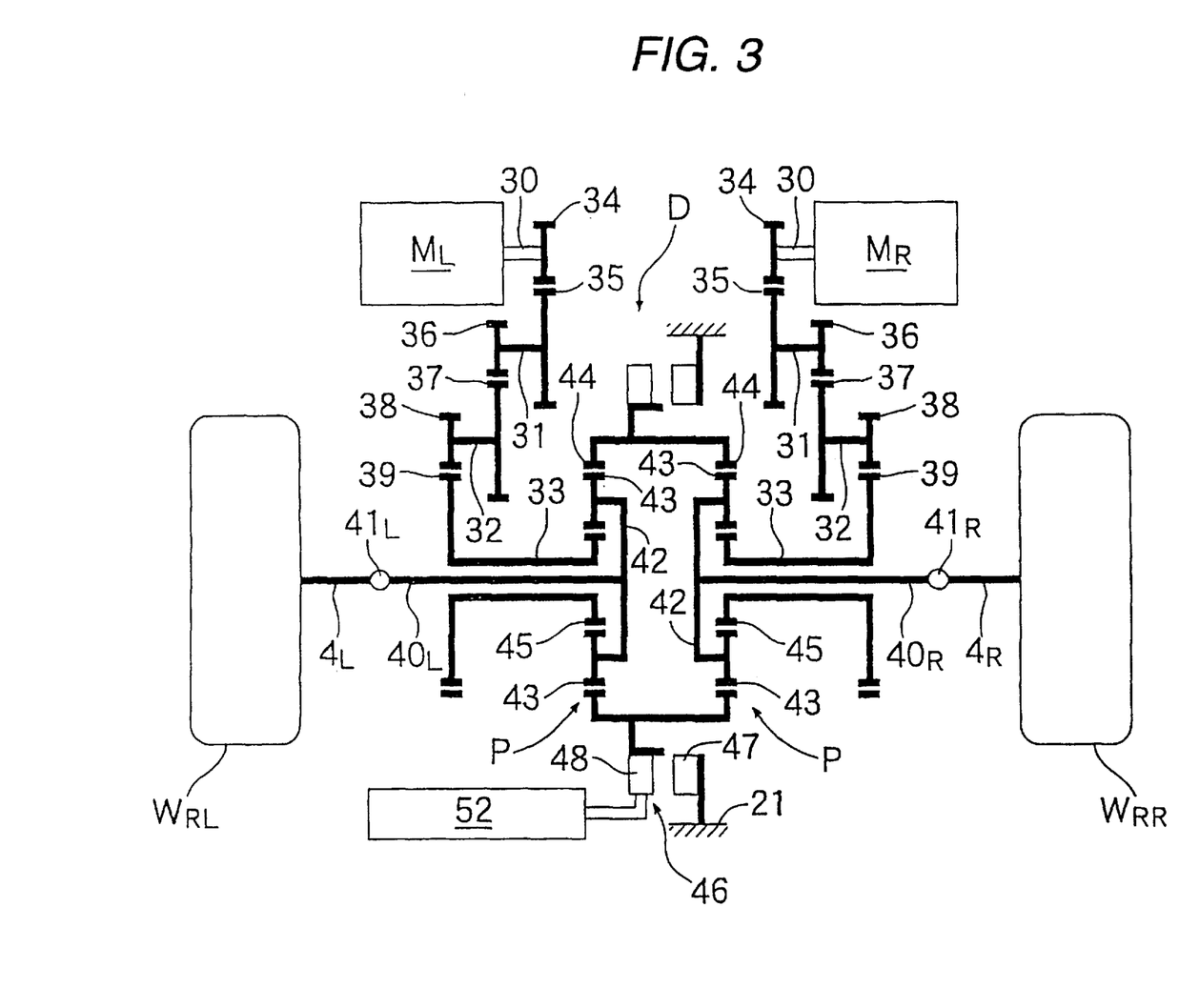
FIG. 3 is a skeleton diagram of the rear wheel driving device.

As is clear when referring to FIG. 3, when the front wheels ($W_{FL}$, $W_{FR}$) are driven by the engine E to start the vehicle V, the rear wheels $W_{RL}$, $W_{RR}$ rotate by virtue of friction force imparted by the road surface. When this happens, since the motors $M_L$, $M_R$ are at a halt, the sun gears 45, 45 of the planetary gear mechanism P are also at a halt. When the rotations of the rear wheels $W_{RL}$, $W_{RR}$ are transmitted to the planetary carriers 42, 42 from the output shafts $40_L$, $40_R$, the ring gears 44, 44 in mesh with planetary gears 43, ... rotate together with the movable dog 48 of the dog clutch 46. When a slip of the front wheels $W_{FL}$, $W_{FR}$ is detected in this state, the dog clutch 46 is engaged so as to drive the motors $M_L$, $M_R$, as described above, since the movable dog is in the rotating state, a smooth engagement thereof with the stationary dog 47 becomes difficult.

Then, if the motors $M_L$, $M_R$ are driven to rotate the sun gears 45, 45 prior to the engagement of the dog clutch 46, the rotation of the movable dog 48 taking place from the rotation of the planetary carries 42, 42 can be cancelled so as to maintain the movable dog 48 in the halt state, whereby a smooth engagement of the movable dog 48 with the stationary dog 47 can be effected. When this happens, since the rotation number of the rear wheels can be detected by the rear wheel speed sensors $S_2$, $S_2$, a target motor rotation number needed to stop the movable dog 48 being rotated with the driving force imparted from the rear wheels $W_{RL}$, $W_{RR}$ can be calculated based on the number of teeth of the respective gears. Since the rear wheel speed sensors $S_2$, $S_2$ generally provided on the vehicle for the anti-lock braking system and the traction control system can be used as they are, there is no need to add any special sensor.

Thus, if the motors $M_L$, $M_R$ are driven idly at the target motor rotation number calculated as described above to stop the movable dog 48 and the dog clutch 46 is engaged in that state, an engagement shock can be eliminated, but in reality it is difficult to make the motor rotation number Nm coincide with the target motor rotation number only by idly driving the motors, and therefore after the actual motor rotation number Nm is detected, a feedback control has to be carried out so as to make the motor rotation numbers coincide with the target motor rotation number. However, providing a motor rotation number sensor triggers an increase in cost, and therefore, in this embodiment, the motor rotation number is designed to be estimated without provision of a motor rotation number sensor, whereby the number of components involved and production cost are attempted to be reduced.

A method for estimation will be described while referring to FIGS. 7A and 7B.

Figure 7A:
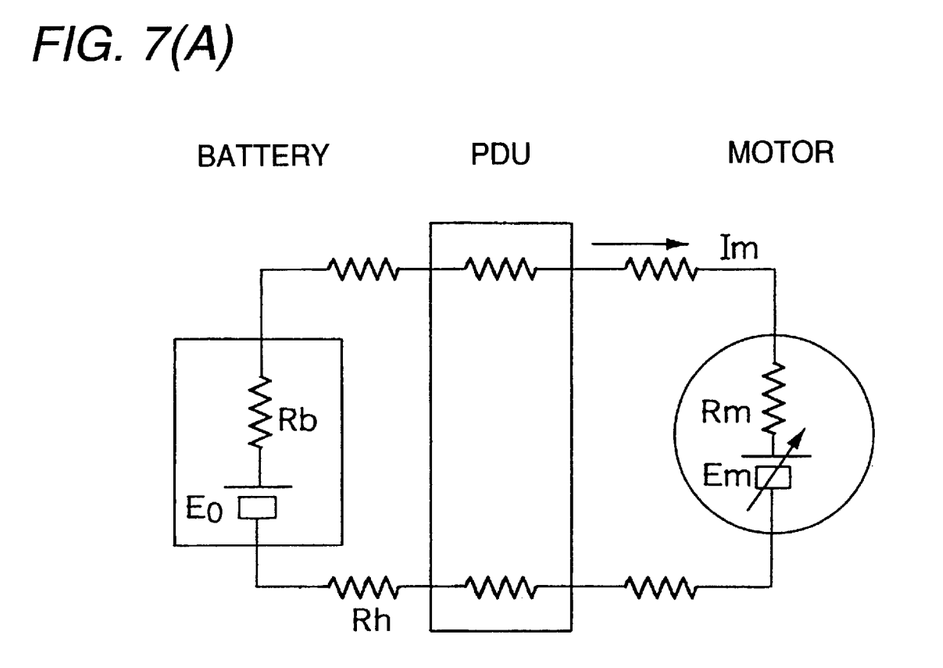
FIGS. 7A and 7B are diagrams showing, respectively, a motor driving circuit and an equivalent circuit thereof.

FIG. 7A shows a system of one of left and right driving circuits of the left and right motors $M_L$, $M_R$, and here $E_0$ denotes the electromotive force of a second battery $B_2$, Rb an internal resistance of the second battery $B_2$, Rh a circuit resistance, Im a motor current, Rm an internal resistance of the motor $M_L$ ($M_R$) and Em the electromotive force of the motor $M_L$ ($M_R$).

Figure 7B:
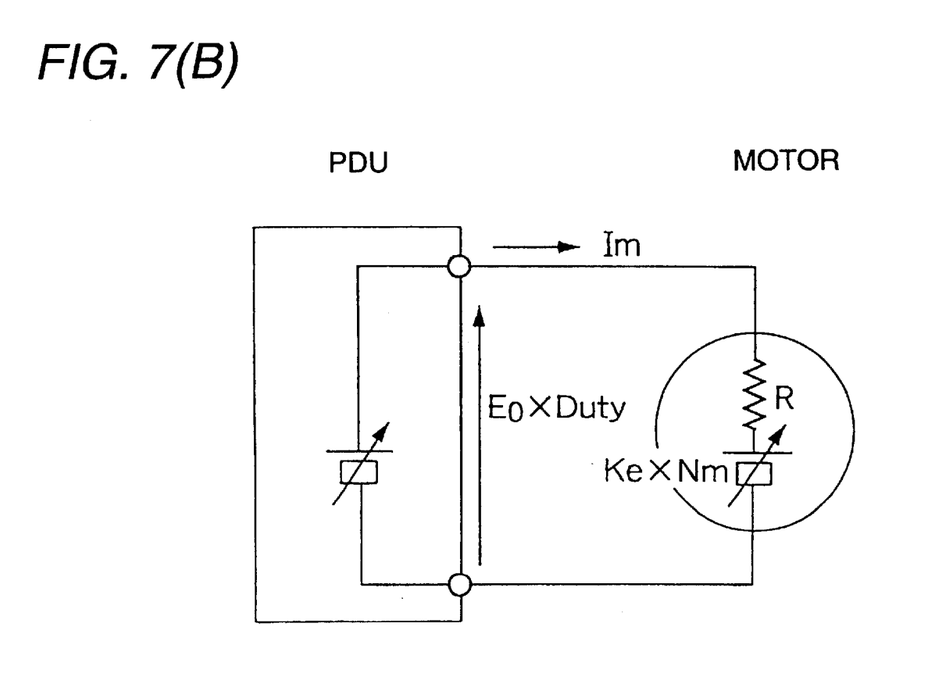

FIG. 7B shows an equivalent circuit resulting from the simplification of the circuit shown in FIG. 7A. Here, $E_0 \times Duty$ denotes what results when multiplying the electromotive force $E_0$ of the second battery $B_2$ by the duty value Duty, and it corresponds to a voltage that is outputted by the power drive unit. Ke×Nm denotes the electromotive force of the motor $M_L$ ($M_R$), which can be obtained by multiplying the electromotive force constant by the motor rotation number Nm. In addition, Im denotes the motor current and R denotes the total resistance of the circuit.

Thus, from the equivalent circuit shown in FIG. 7B. the following expression can be obtained;

$$Ke \times Nm + Im \times R = E_0 \times Duty \quad (1)$$

And from the expression (1) the motor rotation number Nm is estimated as is expressed below.

$$Nm = (E_0 \times Duty - Im \times R)/Ke \quad (2)$$

Figure 1:
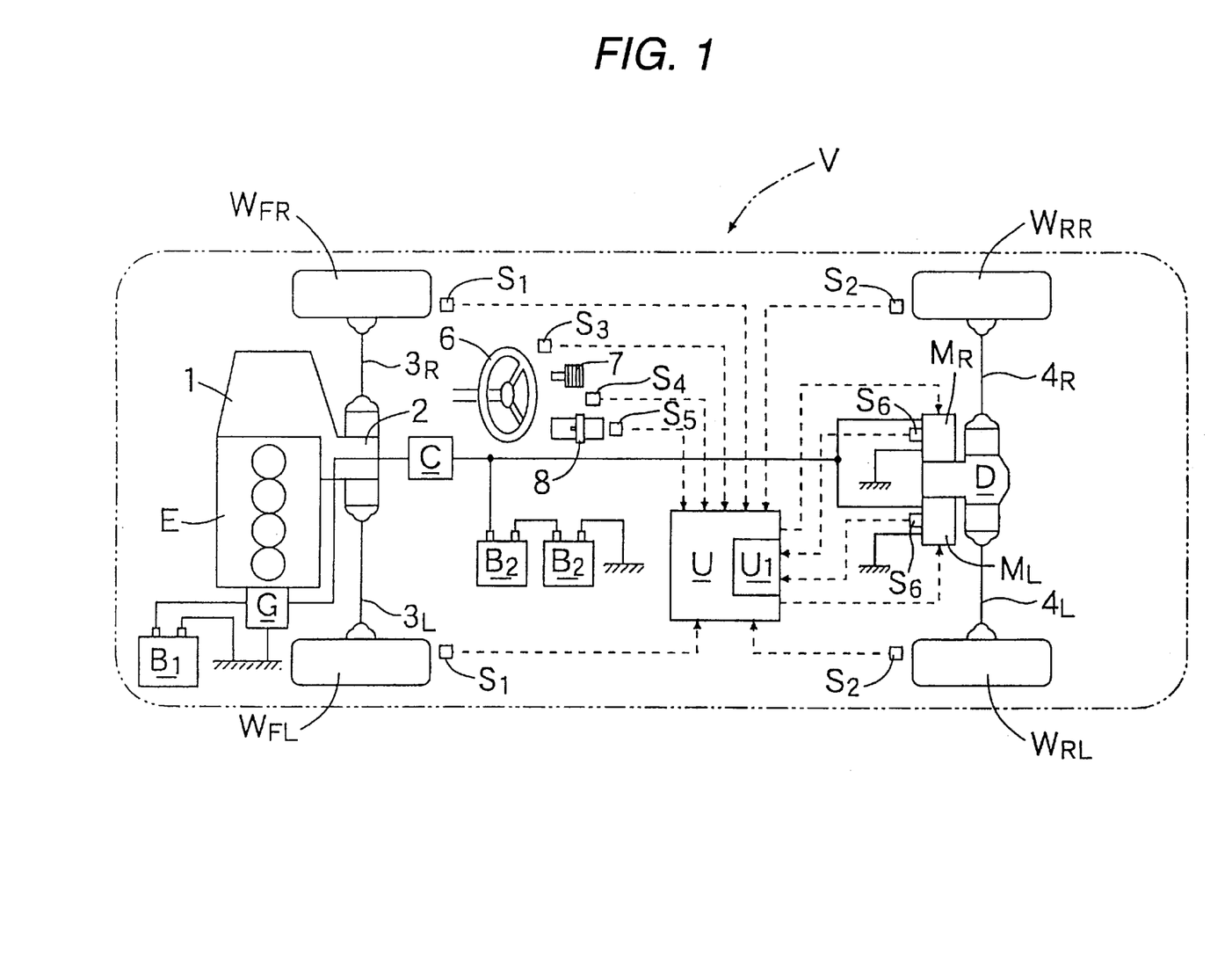
FIG. 1 is a diagram showing the overall construction of a front-and-rear wheel drive vehicle.

The aforesaid estimation of the motor rotation number Nm is effected at the motor rotation number estimation means $U_1$ (refer to FIG. 1). In other words, the duty value Duty in the expression (2) is computed in the electronic control unit U and the motor current Im can be detected by the current sensors $S_6$, $S_6$, and the electromotive force $E_0$ of the second battery $B_2$, the total resistance R of the circuit and the electromotive force constant Ke are all the well known constants. Although the electromotive force $E_0$ of the second battery $B_2$ slightly varies, such variation does not affect much the engagement control of the dog clutch 46.

Figure 8:
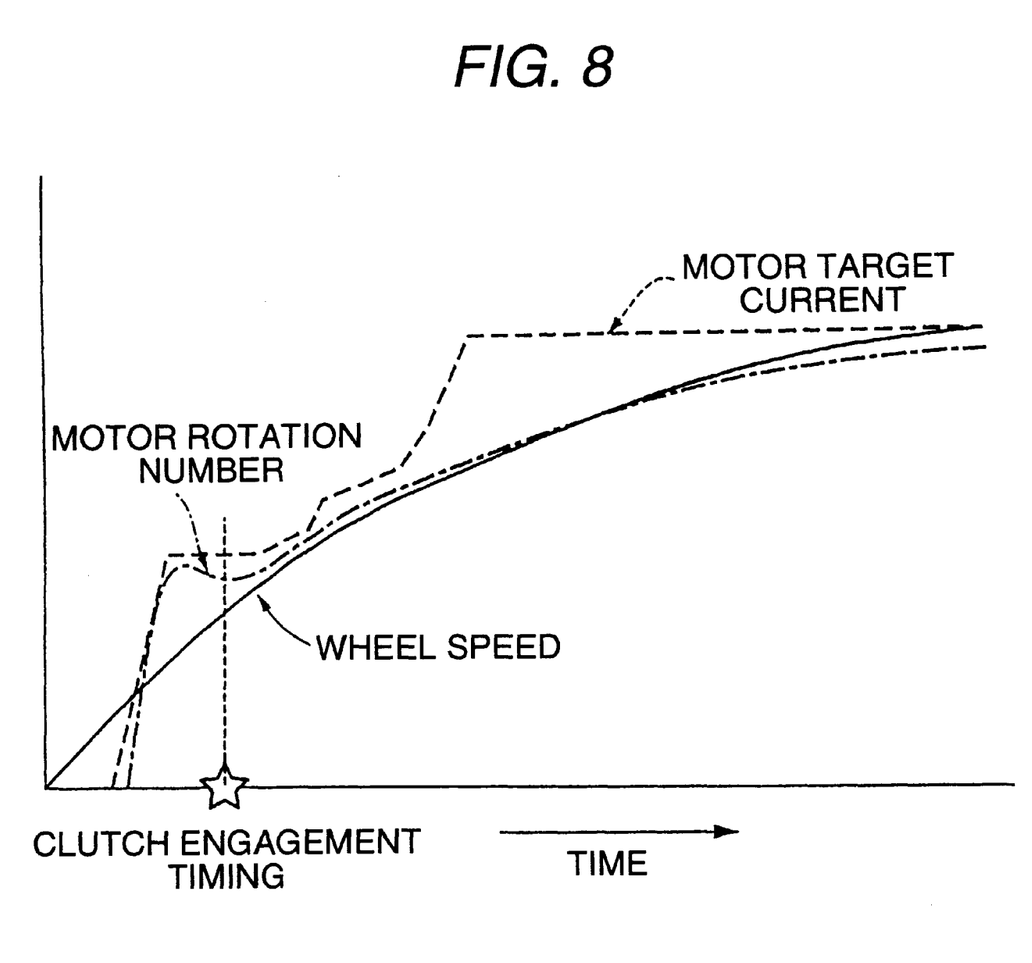
FIG. 8 is a time chart explaining the engagement control of a dog clutch.

Thus, as shown in FIG. 8, when the wheel speeds of the rear wheels $W_{RL}$, $W_{RR}$ start to increase as the vehicle V starts, a target current for the motors $M_L$, $M_R$ is caused to rise linearly once, and the movable dog 48 of the dog clutch 46 is driven via the planetary gear mechanisms P, P. Then, the motor rotation number Nm (a value converted into the rotation number of the movable dog 48) estimated by the expression (2) is compared with the wheel speeds (values converted into the rotation number of the movable dog 48) detected with the rear wheel speed sensors $S_2$, $S_2$, and the target currents of the motors $M_L$, $M_R$ are feedback controlled so that the motor rotation numbers Nm coincide with the wheel speeds. Then, when the motor rotation numbers Nm approach the wheel speeds close enough, in other words, when the rotation of the movable dog 48 by the rear wheels $W_{RL}$, $W_{RR}$ is cancelled by the rotation of the motors $M_L$, $M_R$ so that the rotation of the movable dog 48 is stopped or slowed, if the dog clutch 46 is engaged, then an engagement shock can be reduced.

If the feedback control of the target currents of the motors $M_L$, $M_R$ continues to be carried out so that the motor rotation numbers Nm coincide with the wheel speeds even after the engagement of the dog clutch is completed, the motor rotation numbers Nm can follow the wheel speeds in a smooth fashion, thereby making it possible to prevent the generation of hunting. Then, the above control is completed when the target currents of the motors $M_L$, $M_R$ reach final target values.

Thus, while the embodiment of the present invention has been described in detail, the present invention may be modified variously in design without departing from the scope and sprit thereof.

For example, although, in the embodiment, the front wheels $W_{FL}$, $W_{FR}$ are driven by the engine E, while the rear wheels $W_{RL}$, $W_{RR}$ are driven by the motors $M_L$, $M_R$ on the contrary, the rear wheels $W_{RL}$, $W_{RR}$ may be driven by the engine E, while the front wheels $W_{FL}$, $W_{FR}$ may be driven by the motors $M_L$, $M_R$.

According to the first feature of the invention, when the starting assist by the motors is attempted in starting the vehicle by engaging the dog clutch, since the dog clutch is engaged after the control means controls the motor rotation numbers such that motor rotation numbers estimated with the motor rotation number estimating means coincide with motor rotation numbers corresponding to wheel speeds detected with the wheel speed sensors, it is possible to eliminate a relative rotation between the teeth of the respective dogs which are being brought into mesh engagement with each other to thereby have a smooth engagement of the dogs. Moreover, since the motor rotation numbers needed to control the motors so as to have such a smooth engagement are estimated from the current and duty value of the motors without using any special motor rotation number sensor, it is possible to avoid an increase in the number of components involved and cost. In particular, since the wheel speed sensors generally provided on the vehicle for the anti-lock braking system and the traction control system can be used as the wheel speed sensors for this purpose, there is no risk of increasing the number of components involved and production cost.

The present disclosure relates to the subject matter contained in Japanese Patent Application No.Hei.11-176013filed on Jun. 22, 1999 which is expressly incorporated herein by reference in its entirety.

What is claimed is:

1. A front-and-rear wheel drive vehicle comprising:
   an engine driving one of pairs of front wheels and rear wheels;

a motor driving the other pair of wheels;

a wheel speed sensor detecting wheel speeds of the other pair of wheels;

a dog clutch provided between said motor and the other pair of wheels;

a motor rotation number estimating unit estimating the motor rotation number from the current value and the duty value of said motor; and a control unit controlling the motor rotation number and the engagement of said dog clutch, wherein said control unit engages said dog clutch after said control unit controls the motor rotation number such that the motor rotation number estimated by said motor rotation number estimating unit coincides with the motor rotation number corresponding to wheel speeds detected with said wheel speed sensor.

2. A front-and-rear wheel drive vehicle according to claim 1, wherein when the vehicle starts, said dog clutch is engaged to allow said motor to drive the other pair of wheels so as to render assistance in starting, and said assistance in starting is stopped when the vehicle speed reaches a predetermined value.

3. A front-and-rear wheel drive vehicle according to claim 1, wherein said control unit includes said motor rotation number estimating unit.

4. A front-and-rear wheel drive vehicle according to claim 1, further comprising:

planetary gear mechanisms connecting between the other pair of wheels and said motor.

5. A front-and-rear wheel drive vehicle according to claim 4, wherein said planetary gear mechanisms respectively include planetary carriers connecting with the other pair of wheels, planetary gears rotatably supported to said planetary carriers, sun gears interlocking with said motors and ring gears having a movable dog of said dog clutch.

6. A front-and-rear wheel drive vehicle comprising:

an engine for driving one of pairs of front wheels and rear wheels;

a motor for driving the other pair of wheels;

a wheel speed sensor for detecting wheel speeds of the other pair of wheels;

a dog clutch provided between said motor and the other pair of wheels;

a motor rotation number estimating means for estimating the motor rotation number from the current value and the duty value of said motor; and a control means for controlling the motor rotation number and the engagement of said dog clutch, wherein said control means engages said dog clutch after said control means controls the motor rotation number such that the motor rotation number estimated by said motor rotation number estimating means coincides with the motor rotation number corresponding to wheel speeds detected with said wheel speed sensor.

* * * * *